US009420401B2

(12) United States Patent
Rao et al.

(10) Patent No.: US 9,420,401 B2
(45) Date of Patent: Aug. 16, 2016

(54) METHOD AND SYSTEM FOR A VEHICLE COMPUTING SYSTEM COMMUNICATING TO A SOCIAL MEDIA SITE

(71) Applicant: FORD GLOBAL TECHNOLOGIES, LLC, Dearborn, MI (US)

(72) Inventors: Manoharprasad K. Rao, Novi, MI (US); Kwaku O. Prakah-Asante, Commerce Township, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 14/279,399

(22) Filed: May 16, 2014

(65) Prior Publication Data

US 2015/0334506 A1   Nov. 19, 2015

(51) Int. Cl.
*H04W 4/00* (2009.01)
*H04W 8/18* (2009.01)
*H04L 29/08* (2006.01)
*H04B 1/3822* (2015.01)

(52) U.S. Cl.
CPC ............. *H04W 4/003* (2013.01); *H04B 1/3822* (2013.01); *H04L 67/12* (2013.01); *H04W 8/18* (2013.01)

(58) Field of Classification Search
CPC ....... H04W 4/021; H04W 4/22; H04W 4/003; H04W 8/18; H04B 1/3822
USPC .......... 340/442, 443; 455/404.2, 456.6, 414.1
See application file for complete search history.

(56) References Cited

U.S. PATENT DOCUMENTS

| | | | |
|---|---|---|---|
| 8,624,758 B2 | 1/2014 | Ingram | |
| 2013/0024060 A1 | 1/2013 | Sukkarié et al. | |
| 2013/0080345 A1 | 3/2013 | Rassi | |
| 2013/0150004 A1* | 6/2013 | Rosen | 455/414.1 |
| 2014/0040434 A1 | 2/2014 | Rybak et al. | |
| 2014/0171013 A1* | 6/2014 | Varoglu et al. | 455/404.2 |
| 2014/0180764 A1* | 6/2014 | Lehmann | 705/7.32 |
| 2014/0316979 A1* | 10/2014 | Williams | 705/39 |
| 2014/0324395 A1* | 10/2014 | Silverman et al. | 703/1 |
| 2015/0180999 A1* | 6/2015 | Pisz | 455/404.2 |
| 2015/0224963 A1* | 8/2015 | Poder | B60R 25/102 340/426.13 |

\* cited by examiner

*Primary Examiner* — Inder Mehra
(74) *Attorney, Agent, or Firm* — Jennifer M. Stec; Brooks Kushman P.C.

(57) ABSTRACT

A vehicle computing system comprising at least one controller configured with a transceiver to connect with a server via a communication network connection. The controller may be configured to login to the server via a vehicle identification comprising at least one of a user-name and password for access to profile data. The controller is further configured to transmit at least one of contact identification, a message to communicate with a contact, and vehicle information. The controller is further configured to receive at least a portion of a contact and vehicle profile based on at least one of the contact and vehicle identification. The controller is further configured to transmit the at least a portion of the contact and vehicle profile to one or more systems.

29 Claims, 7 Drawing Sheets

METHOD AND SYSTEM FOR A VEHICLE COMPUTING SYSTEM COMMUNICATING TO A SOCIAL MEDIA SITE

TECHNICAL FIELD

The present disclosure relates to social networks. The present disclosure also relates generally to technologies for vehicle infotainment systems.

BACKGROUND

U.S. Pat. No. 8,624,758 generally discloses a telemetric device for a vehicle that includes a location determining device and a transmitting device. The location determining device is arranged to determine the vehicle's location. The transmitting device is arranged to continuously or nearly continuously transmit location data concerning the vehicle in real-time or near real-time. The transmission of the location data is not based on a condition of the vehicle and is without prompting by a user.

U.S. Patent Application 2014/0040434 generally discloses systems, methods, and related computer programs provided wherein vehicle operation data is extracted from an internal automotive network. A system for enabling the generation and sharing of vehicle operation data via a computer network includes a data harvesting device connected to an information system of a vehicle and a computer system. The data harvesting device may capture vehicle information from the vehicle and process the vehicle information to generate current vehicle operation data. The computer system includes one or more server computers connected to a computer network. The data harvesting device connects to the computer system on an intermittent basis via a wireless network. The computer system includes a database system for logging the current vehicle operation data. The computer system is configured to act as an information gateway for provisioning the current vehicle operation data to one or more remote server computers in communication with the computer system. The computer system is also operable to enable the sharing of vehicle operation data and related information via social networks.

U.S. Patent Application 20130080345A1 generally discloses a system and method for sharing vehicle information in a social networking system. The method may include receiving identification information and vehicle information relating to a plurality of vehicles. The vehicle information relating to the first vehicle and an identification of a first vehicle associated with a first user. The identification information and the vehicle information relating to the plurality of vehicles are stored in the social networking system. The identification information and the vehicle information relating to the first vehicle are compared to the identification information and the vehicle information relating to the plurality of vehicles to determine at least one relation between the first vehicle and the plurality of vehicles. The method may transmit to a plurality of users statistical information based on the at least one relation associated with the first vehicle and the plurality of vehicles defined in the social networking system.

SUMMARY

In at least one embodiment, a vehicle computing system comprising at least one controller configured with a transceiver to connect with a server via a communication network connection. The controller may be configured to login to the server via a vehicle identification comprising at least one of a user-name and password for access to profile data. The controller is further configured to transmit at least one of contact identification, a message to communicate with a contact, and vehicle information. The controller is further configured to receive at least a portion of a contact and vehicle profile based on at least one of the contact and vehicle identification. The controller is further configured to transmit the at least a portion of the contact and vehicle profile to one or more systems.

In at least one embodiment, a vehicle car sharing method managed by a server (i.e., social media site) in communication with the vehicle computing system. The method may generate a vehicle profile at the server. The method may establish, via a communication network, communication between a vehicle computing system and the vehicle profile. The method may receive a use request to reserve a predefined period of time at the vehicle profile from a first user. The method may receive a car-sharing characteristic variable from a second user based on the use request. The method may monitor the car sharing characteristic via the VCS during the predefined period of time.

In at least one embodiment, a computer-program product embodied in a non-transitory computer read-able medium that is programmed for communicating profile data stored at a server (i.e., social media site) to a vehicle computing system for configuration of one or more functions of a vehicle. The computer-program product comprises instructions for logging-in to a server via a vehicle identification comprising at least one of a user-name and password for access to profile data. The computer-program product further comprises instructions for transmitting at least one of contact identification, a message to communicate with a contact, and vehicle information. The computer-program product further comprises instructions for receiving at least a portion of a contact profile and vehicle profile based on at least one of the contact and vehicle identification. The computer-program product further comprises instructions for transmitting the at least a portion of the contact and vehicle profile to one or more systems.

BRIEF DESCRIPTION OF THE DRAWINGS

FIG. 7 is a flow chart illustrating an example method of the vehicle computing system transmitting vehicle characteristic data via the social media site;

DETAILED DESCRIPTION

Figure 1:
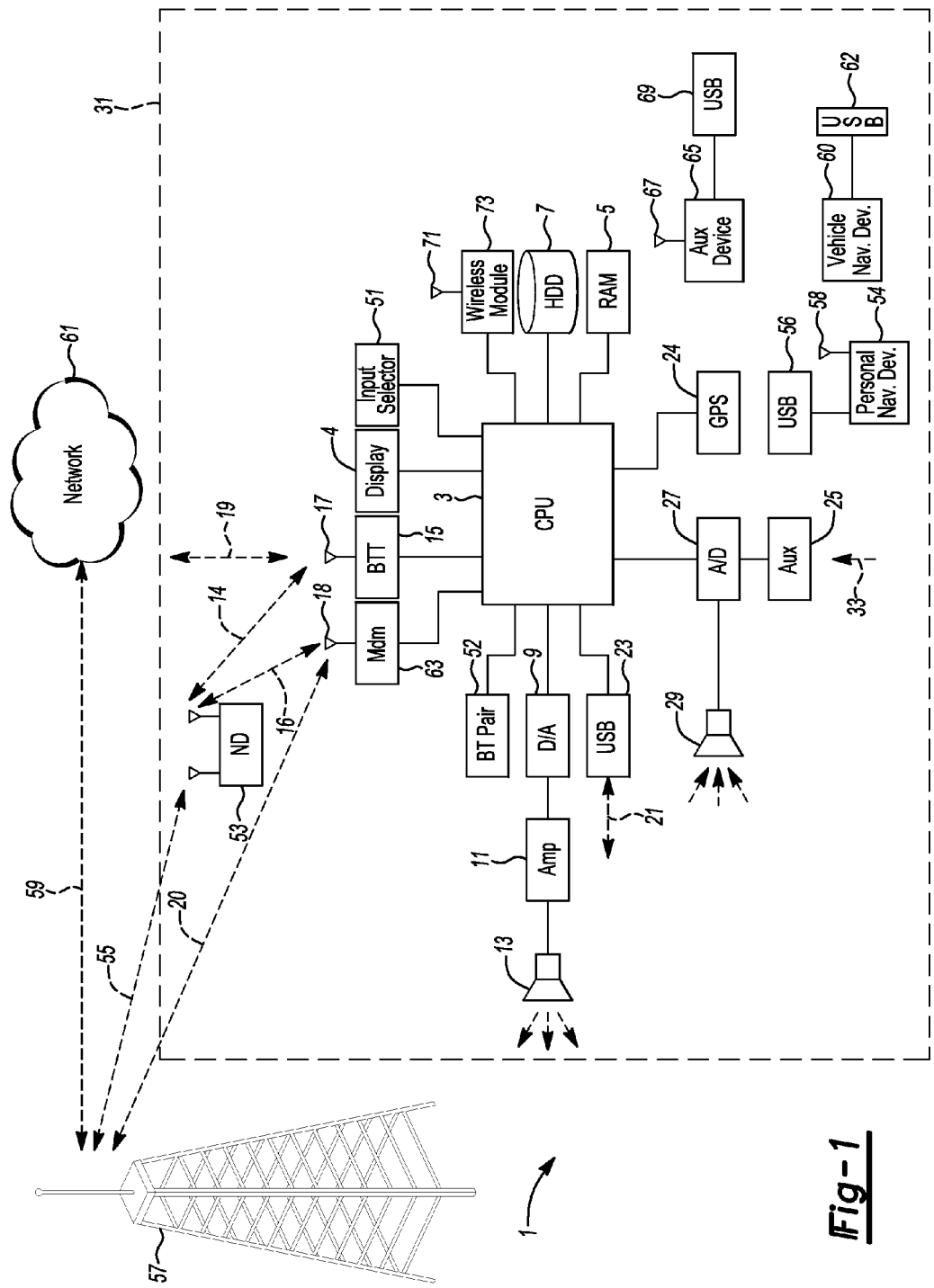
FIG. 1 is an exemplary block topology of a vehicle computing system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may include at least one system comprising one or more controllers and sensors to perform functionality for active safety and driver comfort and convenience. Some of these systems may include radar, a vision sensor, a global position system (GPS), a digital map, and/or an electronic horizon. The vehicle may also be equipped with various interior sensors such as seat weight sensors, interior vision sensors, intelligent key-fobs, and biometric sensors. The system may become more common even in mass volume vehicles. With these capabilities the vehicle may sense its location, traffic lights, road signs, weather, and many other items related to vehicle surroundings.

The data generated by the system may be related to a driver (or occupant) of the vehicle, and may often at times be found at a remote server (e.g., internet cloud). The data may include a significant amount of personal information related to the driver and/or occupant. This data may be used by a vehicle to identify the driver, or some of their personal characteristics, in order to tune the vehicle to the occupant. It may be advantageous to comprise a data cloud entry for the vehicle itself in order to quantify driving habits of various drivers of the same vehicle, or determine miles driven, and/or locations visited by the vehicle. The data cloud may include, and/or be associated with, a server (i.e., a social media site). The vehicle may be operated by a number of different drivers, therefore a vehicle associated as its own data entry at the data cloud may be beneficial to manage several features and function in communication with a vehicle computing system.

This disclosure provides a method and system to enable a vehicle profile as an entity at the social media site such as FACEBOOK™, TWITTER™, GOOGLE+™, etc. . . . The vehicle may have a profile configured at the server (i.e., social media site) based on an administrator's selection. The administrator may include, but is not limited to, a vehicle owner, a parent, a rental company coordinator, a driver, an occupant, and/or a corporation that owns the vehicle. The profile of the vehicle at the social media site may allow the vehicle computing system to receive data related to one or more occupants in the vehicle cabin via the social media site. The one or more occupants may be linked (e.g., "contacts", "friends", "followers", etc. . . . ) with the vehicle profile at the social media site. The one or more occupant (i.e., contacts) linked with the vehicle profile enables the vehicle computing system to retrieve and transmit data associated with the occupant. The system communicates data associated with the occupant via the occupant's profile linked to the vehicle's profile. The retrieved data may include, but is not limited to, personal information, music interests, entertainment preferences, and/or calendar entries.

The method and system for managing one or more features and functions of the vehicle computing system using the social media site may be disclosed in this document. The vehicle computing system includes one or more applications executed on the hardware of the system to communicate with the social media site via the vehicle itself as an entity (e.g., a vehicle profile). The vehicle computing system may communicate with the social media site (i.e., server) based on one or more recognized occupants in the vehicle cabin. This disclosure may allow for the vehicle computing system to request data from the social media site and receive information that may be related to the one or more occupants who are listed as contacts at the server. This disclosure may also allow for the vehicle computing system to transmit data related to vehicle use and performance to the social media site.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
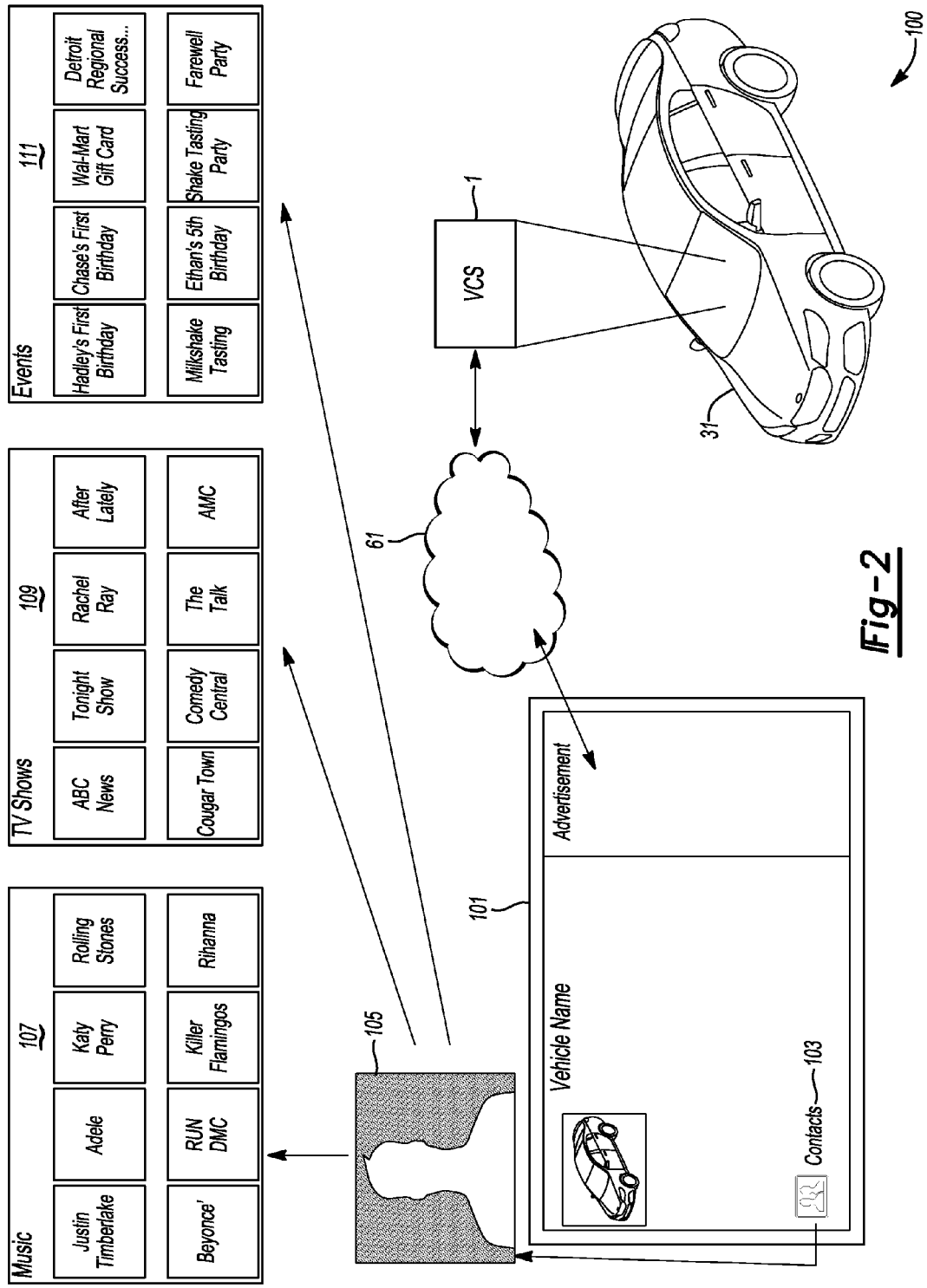
FIG. 2 is an exemplary block topology of a system for enabling the vehicle computing system to communicate with a social media site.

FIG. 2 is an exemplary block topology of a system 100 for enabling the vehicle computing system 1 (VCS) to communicate with a social media site. The VCS 1 may recognize the one or more occupants (not shown) that have entered a cabin of the vehicle 31. The VCS 1 may use one or more sensors or systems to recognize the occupant(s) in the vehicle cabin. The recognition system may include, but is not limited to, smartphone connectivity, seat sensors, interior cameras, biometrics, intelligent key-fobs and/or a combination thereof.

The VCS 1 may comprise one or more applications executed on hardware of a controller to determine where the recognized one or more occupants are positioned within the cabin. The VCS 1 may determine occupant location based on where the synchronization of their smartphone with the VCS 1 has taken place within the vehicle cabin. For example, the VCS 1 may determine occupant position using their smartphone (i.e., nomadic device) connection based on one or more transceivers located in the vehicle cabin and/or USB connections. The VCS 1 may use biometrics, interior cameras, seat sensors and/or a combination thereof to determine occupant location in the vehicle 31. In another example, the VCS 1 may output a message to a display 4 for the one or more occupants to confirm their seating location in the vehicle 31.

The occupant location in the vehicle 31 may be used by the VCS 1 to adjust one or more vehicle functions/features associated with the occupant. For example, if the occupant is recognized as the driver, the vehicle feature/functions may give the diver's information priority and configure the vehicle features/functions based on the driver's preferences. In one example, the vehicle features/functions may include infotainment system settings such as music selection, navigation information, and/or scheduled calendar events notification.

The VCS 1 may include one or more controllers configured with a transceiver to communicate with a network 61. The network 61 may comprise one or more servers that communicate with the social media site. The social media site may include a vehicle profile 101 configuration for a specific vehicle identification number.

The vehicle profile 101 may comprise vehicle information including, but not limited to, a calendar for scheduled use, maintenance, current location, previous locations, and/or contact connections 103 (e.g., the one or more occupants). An administer (i.e., administrator) for the vehicle profile 101 may accept or deny the one or more contact connections 103 requesting to communicate to the vehicle profile 101 via the social media site. The vehicle profile 101 may enable the VCS 1 to receive information from the social media site and/or transmit data to the social media site.

For example, a contact connection 103, in this example referred to as User A (not shown), may have an event to attend to on a particular day. User A may use the calendar at the vehicle profile 101 to request use of the vehicle for that particular day. The calendar may inform the other contact connections that User A has reserved a specific date and time to use the vehicle. In another example, User A may also include additional comments requesting that the vehicle have at least a half tank of gas, or the battery be charged to a certain level before the scheduled event if other contact connections have scheduled to use the vehicle that same day before User A.

The VCS 1 may receive the information including the reservation User A has made for the vehicle 31 from the calendar via the vehicle profile 101. The VCS 1 may inform the one or more occupants in the vehicle cabin of the scheduled event. For example, the VCS 1 may output a message to the occupant of the vehicle if it is the day of the schedule event reserved by User A. The message may be a reminder to have the vehicle back by a certain time because User A has made a reservation. In another example, the message may request that the gas tank be filled and the vehicle 31 washed because User A has reserved the vehicle 31 that day for an event she/he is attending.

In another example, the VCS 1 may recognize an occupant as User B 105. The VCS may transmit a request to retrieve User B 105 information via the vehicle profile 101 at the social media site. The social media site may transmit a message to the VCS 1 confirming that User B 105 is a connected contact 103 at the vehicle profile 101. The social media site may retrieve information related to User B 105 based on the connected contact 103 with the vehicle profile 101. The User B 105 information may be based on settings and/or configuration of how much information the connected contact provides to the social media site. The information provided by User B 105 may include, but is not limited to, personal information (not shown), music preferences 107, TV shows 109, and/or scheduled events 111.

The personal information may include, but is not limited to, gender, age, height, and/or weight. The personal information may also include other personal information including, but not limited, health related details, relationship status, employer, education, and/or other contact information (email, home address, etc. . . . ) The personal information related to User B 105 may be transmitted to the VCS 1 via the network 61. The VCS 1 may receive the personal information and adjust the one or more vehicle features and functions of the system based on User B 105.

For example, the VCS 1 may adjust at least one of seat position, radio settings, navigation settings, and/or safety system restraint configurations. The seat position may be adjusted by the VCS 1 based on the personal information comprising height and weight related to User B 105. The radio settings may be configured by the VCS 1 based on the music preferences 107 related to User B 105. The navigation settings may be configured by the VCS 1 based on the schedule events 111 of User B 105. The safety system may modify at least one of a seat belt restraint, an airbag deployment, antilock braking configuration and/or other restraint device(s) based on the personal information of User B 105.

For example, if User B 105 has personal information disclosing a male occupant, 68 years old, with a weight of 185 lbs, and a height of 5'8". The VCS 1 may communicate this information to one or more safety system. In one example, the safety system may adjust airbag deployment and/or seat position based on the gender, age, height, and weight of User B 105.

Figure 3:
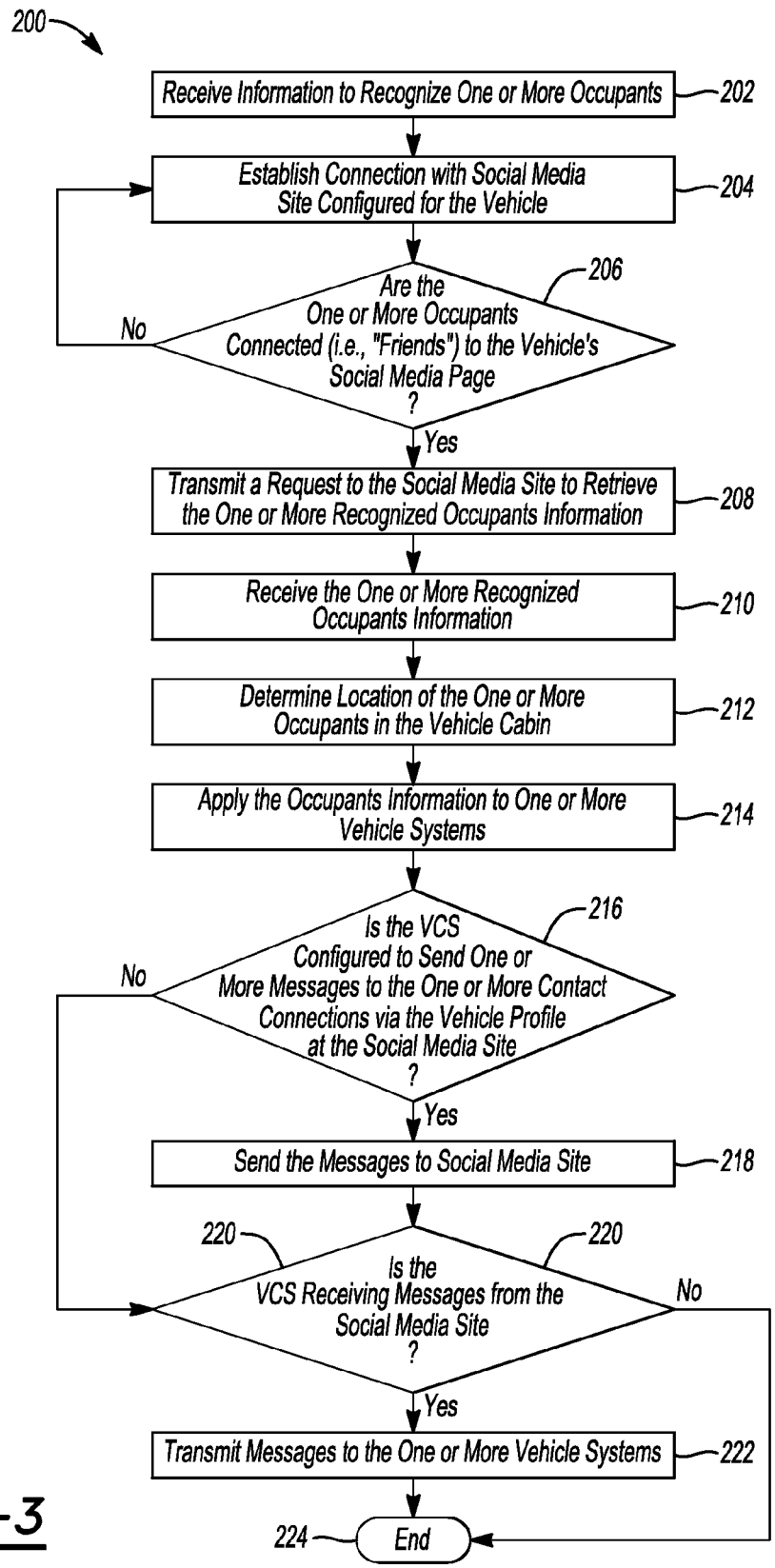
FIG. 3 is a flow chart illustrating an example method of the vehicle computing system communicating with the social media site.

FIG. 3 is a flow chart illustrating an example method of the vehicle computing system communicating with the social media site. The method 200 may be implemented using software code contained within the VCS 1. In other embodiments, the method 200 may be implemented in other vehicle controllers, or distributed amongst multiple controllers in communication with the VCS 1.

Referring again to FIG. 3, the vehicle and its components illustrated in FIG. 1 and FIG. 2 are referenced throughout the discussion of the method to facilitate understanding of various aspects of the present disclosure. The method 200 of recognizing a vehicle occupant and communicating with a vehicle profile 101 to retrieve occupant and/or vehicle information may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 200 appear to occur in a chronological sequence, at least some of the operations may occur in a different order, and some operations may be performed concurrently or not at all.

In operation 202, the VCS 1 may receive information to recognize one or more occupants in the cabin of the vehicle 31. There are several techniques used to recognize one or more occupants in the vehicle cabin including the use of an image sensor (i.e., camera) and/or smartphone. Several recognition techniques were discussed above; however there are other techniques not disclosed but are known by one skilled in the art and may be integrated with the VCS 1.

In operation 204, the VCS 1 may establish a connection with the social media site comprising the vehicle profile 101. The VCS 1 may determine if the one or more occupants are contact connections 103 with the vehicle profile 101 at the social media site in operation 206. The VCS may receive data confirming that the recognized occupant is a contact connection 103 with the vehicle profile 101.

In operation 208, the VCS 1 may transmit a request to the social media site to retrieve the occupant's information. For example, the VCS 1 may request the one or more recognized occupant's personal information, music preferences 107, entertainment interests 109, and/or a combination thereof.

In operation 210, the VCS 1 may receive occupant information from the social media site via the occupant's connection with the vehicle profile 101. For example, the VCS 1 may receive the information made available via an occupant's profile (i.e., contact connection profile) at the social media site. In another example, the occupant's information may be entered by the occupant at the vehicle profile 101.

In operation 212, the VCS 1 may determine the location of the recognized occupant in the vehicle cabin. For example, the VCS 1 may determine if the one or more recognized occupants is the driver of the vehicle 31. The VCS 1 may not assume that the one recognized occupant is the driver of the vehicle 31. The VCS 1 may be configured to enable the driver as a priority for the settings of the one or more vehicle features/functions. If the system is unable to determine which occupant is the driver of the vehicle 31, the VCS 1 may output a message to at least one display to confirm the driver.

For example, the VCS 1 may use one or more sensor to determine the driver of the vehicle including, but is not limited to, seat sensors, smartphone identification, biometrics, interior cameras, and/or a combination thereof. The VCS 1 may verify the occupant location to enable the occupant information be applied correctly at one or more vehicle systems in operation 214. For example, the VCS 1 may adjust the safety restraint system for each occupant based on the received information via the occupant's profile at the social media site.

In operation 216, the VCS 1 may be configured to send one or more messages to the one or more contact connections 103 via the vehicle profile 101 at the social media site (i.e., server). For example, the administrator may configure one or more applications executed on hardware of the VCS 1 such that the system transmits vehicle location to the social media site based on preconfigured factors. The preconfigured factors may include, but is not limited to, a defined occupant, time of day, certain locations of the vehicle, vehicle dynamic information, and/or a combination thereof. The VCS 1 may be configured to transmit the one or more messages based on the preconfigured factors to at least one of the main screen of the vehicle profile 101, to an assigned contact connection 103, the administrator, and/or a combination thereof.

For example, the VCS 1 may recognize two occupants as User C and User D in the vehicle cabin. The VCS 1 may calculate that User C is a driver and transmit this information to the vehicle profile 101 via the social media site. The administrator (i.e., the parent of User C) of the vehicle profile 101 may determine that User C is a teenage driver and may want to monitor vehicle characteristic variables (e.g., vehicle speed, seat belts status, location of vehicle, volume of radio, etc. . . . ). The VCS 1 may transmit one or more messages to the vehicle profile 101 based on the vehicle characteristic variable such that the administrator may monitor the driving behavior of User C.

In operation 218, the VCS 1 may transmit one or more messages based on the vehicle dynamics to the vehicle profile 101 via the social media site. The VCS 1 may receive messages from the social media site including, but not limited to, an administrator message, connected contact messages, advertisement messages, vehicle system updates, and/or other messages generated/received at the social media site in operation 220.

In operation 222, the VCS 1 may transmit the received messages to one or more vehicle systems. The one or more vehicle systems may include, but is not limited to, an infotainment system, safety restraint system, and/or a noise-vibration-handling system. In one example, the VCS may receive an advertisement message from the social media site based on at least one of vehicle location, the one or more recognized occupants, and/or time of day. The advertisement message may be sent to the infotainment system such that the message may be output to a display, speaker, and/or a combination thereof. The VCS 1 may have a security firewall system preventing messages that may corrupt one or more vehicle system. The security firewall may be configured to prevent social media site messages to be transmitted to a safety critical system of the VCS 1.

In operation 224, if a key-off is detected, the VCS 1 may begin to shut-down by transmitting certain data to the vehicle profile 101 at the social media site. The data may also be transmitted to the recognized occupants profile via the social media site. The data may also be saved at the VCS 1 in non-volatile memory. The data may include, but is not limited to, vehicle dynamic information, destinations traveled, and/or vehicle maintenance information. For example, if a key-off is requested, the VCS 1 may transmit the gas level and/or battery charge reading to the vehicle profile 101 so that the next user of the vehicle is aware of the power level.

Figure 4:
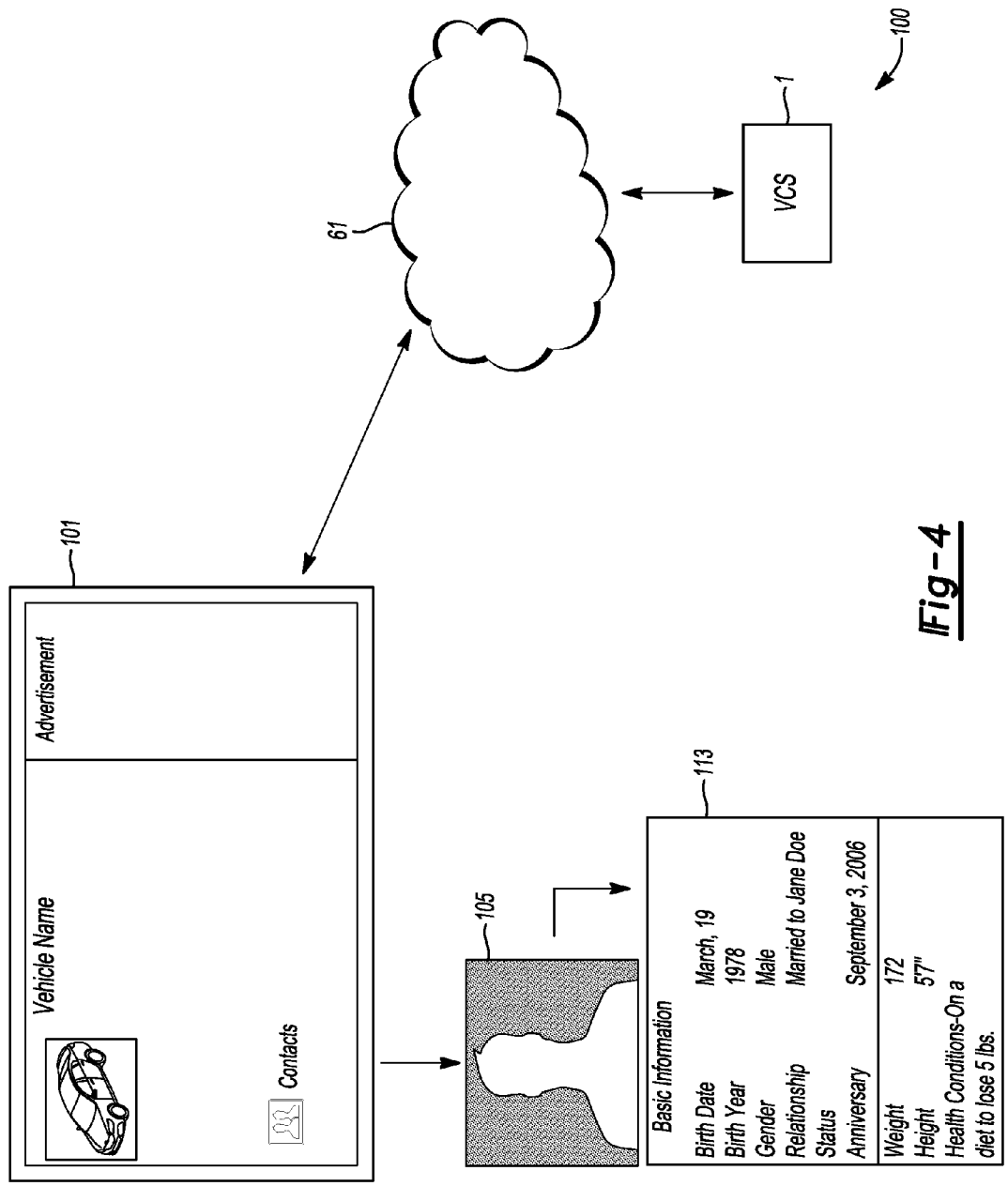
FIG. 4 is an exemplary block topology of the system for retrieving basic information from an occupant linked via the social media site to the vehicle computing system according to an embodiment.

FIG. 4 is an exemplary block topology of the system 100 retrieving personal information 113 from an occupant 105 linked via the social media site to the vehicle computing system according to an embodiment. The VCS 1 may recognize an occupant 105 in the vehicle cabin. The VCS 1 may communicate with a network 61 to retrieve data related to the recognized occupant 105 via the vehicle profile 101. The occupant 105 may be linked with the vehicle profile 101 as a contact, such that the information related to the occupant 105 may be retrieved and transmitted to the VCS 1.

The occupant 105 may comprise an individual profile separate from the vehicle profile 101. In one example, based on a request made by the occupant 105, the occupant profile may be linked to the vehicle profile 101. The administrator of the vehicle profile 101 may accept or deny a contact connection request form the occupant 105. In another example, the vehicle profile 101 may contain information regarding the occupant 105 instead of comprising separate profiles. The personal information 113 related to the occupant 105 may include, but is not limit to, age, gender, relationship status, weight, height, and/or health conditions.

The personal information 113 may be received by one or more system in communication with the VCS 1. The one or more systems include vehicle features/functions that may be adjusted based on the occupant's personal information. In one example, in the event of a car accident, the VCS 1 may transmit a message to the person associated in the relationship status of the occupant's personal information. The car accident message to the relationship status contact may inform the significant other that the occupant 105 has been in an accident. The message may include additional information including, but not limited to, vehicle location.

The personal information 113 may be used by the VCS 1 in combination with biometrics to monitor health characteristics of the occupant. For example, the occupant 105 may include information regarding heart problems in the past in his personal information 113. The VCS 1 may monitor the pulse of the occupant using a seat sensor, and/or other biometric sensors to monitor the heart rate of the occupant. The VCS 1 may calculate that the occupant is having health issues based on the seat sensor and/or other biometric sensors, the system may send one or more messages via the social media site to get assistance for the occupant.

Figure 5:
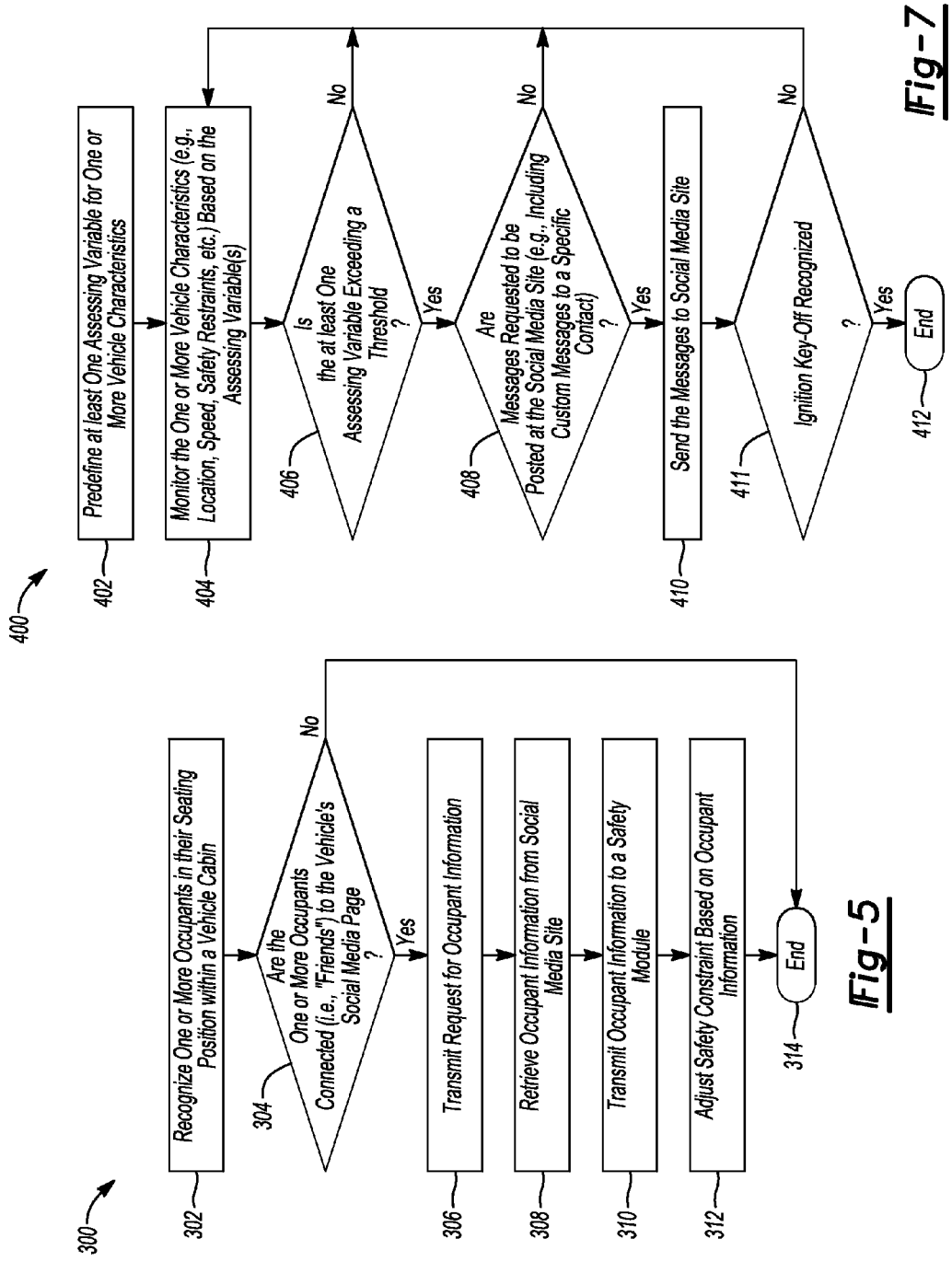
FIG. 5 is a flow chart illustrating an example method of the vehicle computing system communicating with the social media site based on one or more recognized occupants in a vehicle.

FIG. 5 is a flow chart illustrating an example method 300 of the vehicle computing system communicating with the social media site based on one or more recognized occupants in a vehicle. The method 300 may be implemented using software code contained within the VCS 1. In other embodiments, the method 300 may be implemented in other vehicle controllers, or distributed amongst multiple controllers in communication with the VCS 1.

In operation 302, the VCS 1 may recognize one or more occupants in their seating position within the vehicle cabin. The VCS 1 may determine whether the one or more occupants are connected (i.e., "Friends") to the vehicle profile 101 via the social media site in operation 304.

In operation 306, if the occupant is connected with the vehicle profile 101, the VCS 1 may transmit a request for occupant information. The VCS 1 may receive the occupant information based on the vehicle profile 101 connection via the social media site in operation 308.

In operation 310, the VCS 1 may transmit occupant information to a safety module to adjust one or more configuration variables. The one or more configurations may be adjusted using the occupant's profile calculated from the received information in operation 312. The VCS may set the one or more configuration variables to default settings if an occupant is not recognized. The VCS may store the one or more configuration variable in non-volatile memory if a shut-down is being commanded in response to a key-off request in operation 314.

Figure 6:
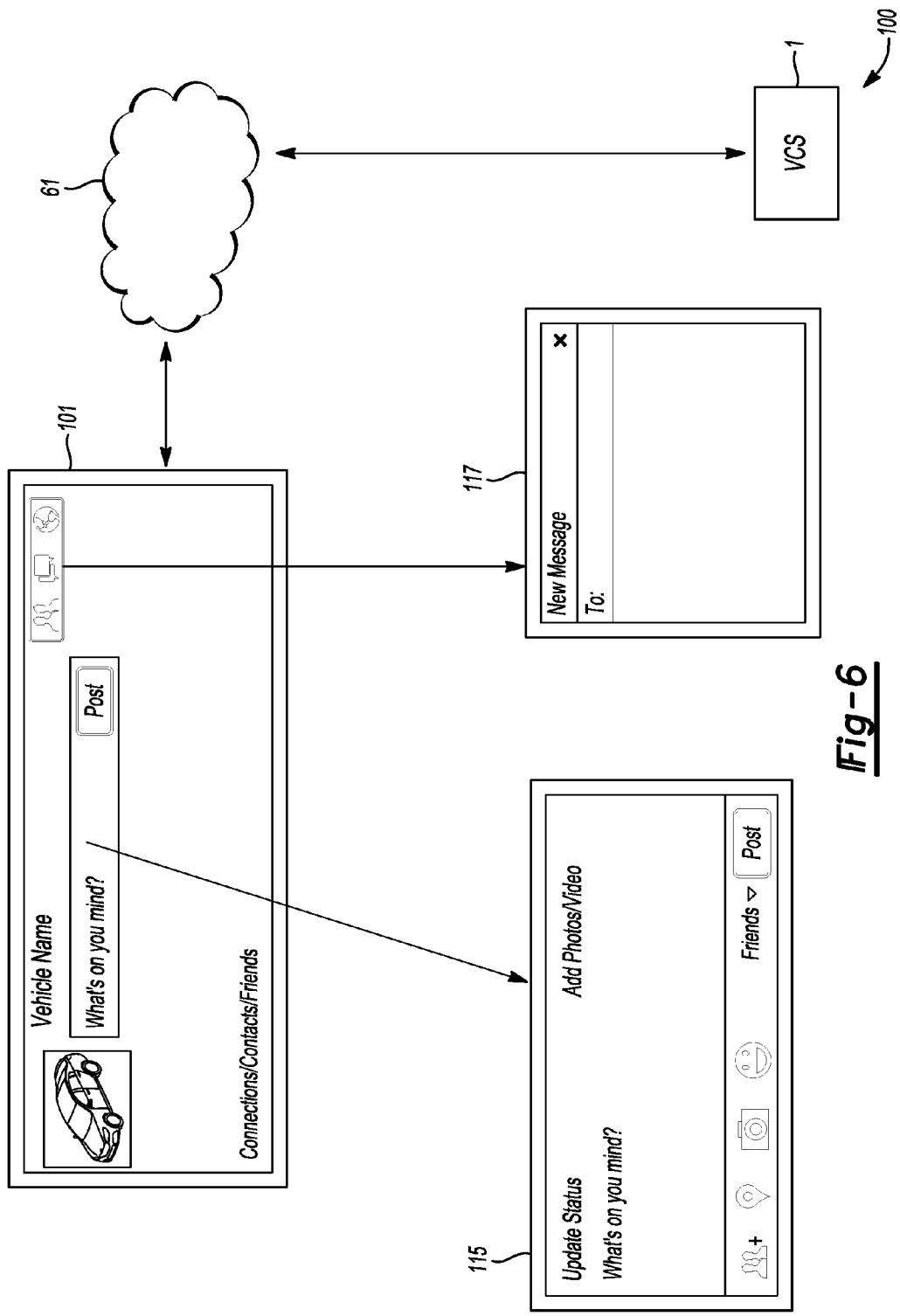
FIG. 6 is an exemplary block topology of the system for transmitting data from the vehicle via the social media site to a vehicle administrator according to an embodiment.

FIG. 6 is an exemplary block topology of the system 100 transmitting data from the vehicle computing system to a vehicle administrator via the social media site according to an embodiment. The VCS 1 may monitor one or more preconfigured vehicle dynamic variables. The one or more preconfigured vehicle dynamic variables may include, but is not limited to, diagnostics, vehicle performance parameters, and/or vehicle monitoring variables. The diagnostics may be associated with monitoring the functionality of one or more systems, subsystems, and/or components of the vehicle. The vehicle performance parameters may include, but is not limited to, measuring oil life, battery voltage, and/or fluid levels. The vehicle monitoring variables may include, speed, acceleration, braking, seatbelt use, location, geofence, and/or other variables to monitor real-time driving.

In one example, the administrator may configure the vehicle dynamic parameters to transmit one or more messages to the vehicle profile 101 if they are flagged (e.g., set true) based on vehicle calibrations and/or a predefined threshold determined by the administrator. The messages may include a posting notification 115 and/or an individual message 117 to an assigned connected contact. The posting notification 115 may be transmitted to the "news feed" of the vehicle profile 101 so that every connected contact 103 may view the message. The individual message 117 may be configured by an administrator to send a message to one or more connected contacts including the administrator.

For example, the administrator may configure that if a diagnostic is set at the VCS 1, the system may transmit an individual message 117 to a service garage via the social media site. The individual message 117 to the service garage may include additional vehicle data including, but not limited to, the vehicle mileage, oil life, and/or fluid levels. The message may enable the dealer to set up an appointment for service and communicate the scheduled time and date using the calendar at the vehicle profile 101.

The administrator may configure the system to transmit a posting notification 115 to the vehicle profile 101 each time the vehicle is parked so the connected contacts 103 know the location of the vehicle 31. In one example, the administrator may configure the system to transmit a posting notification 115 if the vehicle 31 exceeds a threshold related to the geofence.

In another example, if one or more connected contacts 103 plan to share the vehicle the same day at different times, the connected contacts 103 may configure messages to communicate location(s), gas level, and time to the other contacts scheduled to use the vehicle that day. The system disclosed improves communication and management for a share car using the social media site to coordinate between the one or more users.

FIG. 7 is a flow chart illustrating an example method of the vehicle computing system transmitting vehicle characteristic data via the social media site. The method 400 may be implemented using software code contained within the VCS 1 and/or the social media site. In other embodiments, the method 400 may be implemented in other vehicle controllers, or distributed amongst multiple controllers in communication with the VCS 1.

In operation 402, a connected contact 103 may predefine an assessing variable for one or more vehicle characteristics. The predefined assessing variable may be transmitted to the VCS 1 via the network 61 in communication with the vehicle profile 101.

In operation 404, the VCS 1 may monitor the vehicle assessing variable characteristic(s) during the operation of the vehicle 31. The VCS 1 may determine if the assessing variable exceeds a predefined threshold value in operation 406.

In operation 408, if the assessing variable exceeds the threshold value, the VCS 1 may determine if there are messages associated with the assessing variable to be transmitted to the vehicle profile 101 via the social media site. The VCS 1 may continue to monitor the assessing variables even if none have exceeded the threshold value(s) to a level necessitating sending message(s) to the social media site.

In operation 410, the VCS 1 may transmit one or more messages associated with the assessing variable. Once the assessing variable has exceeded the threshold value to a level necessitating sending message(s), the message may be generated. The message may be transmitted to the vehicle profile 101 via the social media site connection. In operation 411, the ignition key-off status is monitored. If a key-off request is not received, the system may continue to monitor the one or more vehicle characteristics. If a key-off request is received, the VCS 1 may store the one or more assessing variables, associated threshold values, and the related messages in non-volatile memory and may end the process in operation 412.

Figures 8, 9:
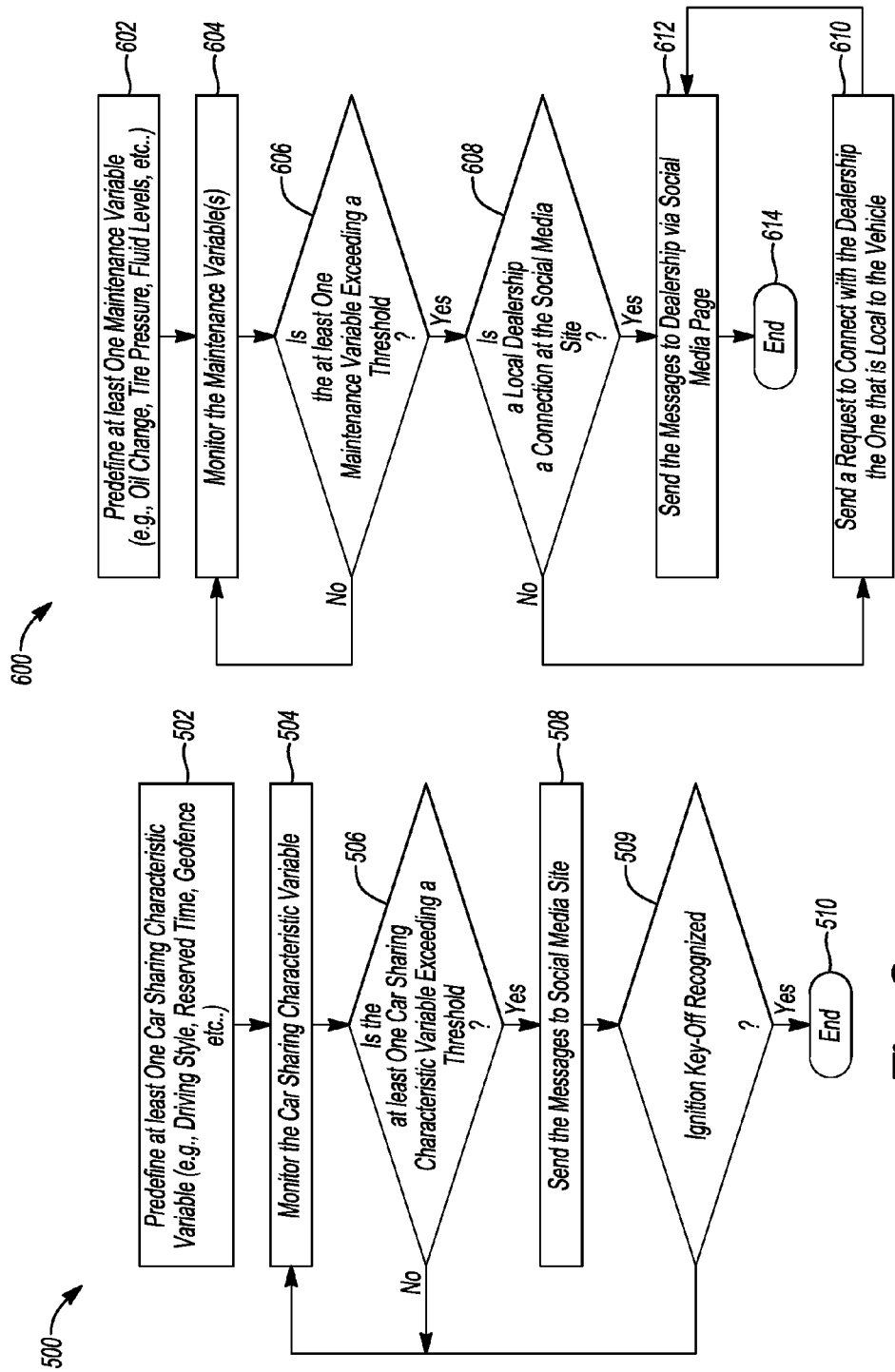
FIG. 8 is a flow chart illustrating an example method of managing a car sharing system for the vehicle via the social media site.
FIG. 9 is a flow chart illustrating an example method of managing vehicle maintenance for the vehicle via the social media site.

FIG. 8 is a flow chart illustrating an example method for managing a car sharing system of the vehicle via the social media site. The method 500 may be implemented using software code contained within the VCS 1 and/or at the social media site. In other embodiments, the method 500 may be implemented in other vehicle controllers, or distributed amongst multiple controllers in communication with the VCS 1.

In operation 502, a connected contact 103 of the vehicle profile 101 may predefine at least one car sharing characteristic variable. The car sharing characteristic variable may include variables defined to monitor driving styles, reserved time slots for use of the vehicle, and/or location limitations (i.e., geofence) of the vehicle.

For example, User A may reserve time to use the vehicle at the vehicle profile calendar (e.g., Saturday from 8:00 A.M. to 11:00 A.M.). The reservation made by User A may be visible to all connected contacts 103 at the vehicle profile 101. In another example, if User B enters the vehicle on Saturday morning before 8:00 A.M., the VCS 1 may output a message notifying User B of the reservation of User A as a reminder.

In operation 504, the system may monitor the car sharing characteristic variable. The system may monitor vehicle location to determine if User A has traveled outside one or more defined geofence parameters set by the administrator. For example, the administrator may define zones where the vehicle may travel by using geofence parameters. If User A exceeds a threshold that violates the geofence, a message may be send to the administrator.

In operation 506, the system may determine if a car sharing characteristic variable exceeds the associated thresholds. For example, the system determines if User A is exceeding the reservation time slot allocated to him. In another example, the system may monitor if User A is exceeding the speed limits and/or violating any other driving laws while operating the vehicle.

In operation 508, the system may transmit a message to the vehicle profile 101 via the social media site if one or more car sharing characteristic variables exceed their respective threshold values. The system may send a message to one or more connected contacts 103, the vehicle profile administrator, and/or to the posting notification of the vehicle profile 101 for all to read. In one example, if User A continues to drive reckless by exceeding speed limits and/or running past stop signs or red lights, the system may transmit a message to the administrator. In another example, if User A is running past his 11:00 A.M. reserved time slot, the system may send a message to the next user who has reserved the vehicle after User A notifying the delay.

In operation 509, the ignition key-off status may be monitored. If a key-off request is not received, the system may return to continue to monitor the car sharing characteristic variable. If a key-off request is received, the VCS 1 may store the one or more car sharing variables, associated threshold values, and the related messages in non-volatile memory and may end the process in operation 510.

FIG. 9 is a flow chart illustrating an example method for managing vehicle maintenance of the vehicle via the social media site. The method 600 may be implemented using software code contained within the VCS 1 and/or at the social media site. In other embodiments, the method 600 may be implemented in other vehicle controllers, or distributed amongst multiple controllers in communication with the VCS 1.

In operation 602, the system may comprise predefining maintenance variables including oil change, tire pressure, and/or fluid levels. The system may monitor the maintenance variables during operation of the vehicle in operation 604.

In operation 606, the system may calculate if the maintenance variable has exceeded a defined threshold value. If the system determines that a maintenance variable has exceeded a threshold value, the system may request a message be sent to a dealership for service. The system may determine if a local dealership is a contact connection 103 with the vehicle profile 101 via the social media site in operation 608.

In operation 610, the system may determine that there is no connection with a dealership, therefore may search and send a request to connect with a dealership profile at the social media site. Once the system recognizes the dealership as a connected contact 103, the system may transmit a message to the dealership to notify of the flagged maintenance variable in operation 612.

For example, if the oil life has exceeded the threshold value, the system may send a message to the dealership requesting an oil change. The dealership may receive the message and schedule an oil change using the calendar at the vehicle profile 101. In another example, the administrator may configure the messages sent to the dealer to have specific instructions based on one or more maintenance variables. The instructions may include, but is not limited to, preferred time slots, a request for an estimate to do the work, and/or notifications for other routine maintenance.

In operation 614, the VCS 1 may store the one or more maintenance variables, associated threshold values, and the related messages in non-volatile memory if a shut-down is being commanded in response to a key-off request.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising;
a controller communicating with a server via a transceiver and programmed to:
in response to a server login for a vehicle profile configured to reject a contact connection request, transmit a message to an accepted contact via the vehicle profile;
in response to a recognized occupant, receive at least a portion of a contact and vehicle profile based on the occupant; and
transmit the contact and vehicle profile to a vehicle module.

2. The system of claim 1,
wherein the controller is further programmed to recognize the occupant in a cabin of the vehicle, transmit contact identification based on the occupant, and receive a portion of the contact profile including at least one of basic information, music preference, entertainment preferences, and scheduled events from the occupant via the server.

3. The system of claim 2, wherein the controller is further programmed to receive a portion of the at least one basic information, music preference, entertainment preferences, and scheduled events and transmit the portion to one or more vehicle features or functions in communication with the vehicle module.

4. The system of claim 3 wherein the basic information is at least one of age, gender, weight, and height.

5. The system of claim 4, wherein the basic information is used by the vehicle module to calibrate a vehicle restraint system for the occupant.

6. The system of claim 5, wherein the controller is further programmed to determine location of the occupant in the cabin of the vehicle such that a restraint device for the occupant is calibrated by the vehicle restraint system.

7. The system of claim 6, wherein the controller is further programmed to output a message to confirm the location of the occupant in the cabin of the vehicle.

8. The system of claim 1, wherein the controller is further programmed to enable a security firewall to prevent data received from the server to be transmitted to a restricted system.

9. The system of claim 1, wherein the profile data is at least one of vehicle location, speed, maintenance data, safety restraint status, and number of occupants in the vehicle.

10. The system of claim 9, wherein the safety restraint status is an indicator to determine if a seat belt is engaged or disengaged for the occupant.

11. The system of claim 9, wherein the maintenance data is at least one of oil life, tire pressure, and stored diagnostic codes.

12. The system of claim 1, wherein the server is a social media site.

13. A method comprising:
establishing, via a communication network, communication between a vehicle computing system (VCS) and a vehicle profile at a server;
receiving a request to reserve a predefined time at the vehicle profile from a first user;
receiving a car sharing variable from a second user based on the request;
monitoring the car sharing variable via the VCS during the predefined time; and
transmitting the car sharing variable to the server during the predefined time.

14. The method of claim 13, wherein the car sharing variable is at least one of vehicle location, geofence, speed, maintenance data, safety restraint status, and number of occupants in a vehicle.

15. The method of claim 14, further comprising transmitting a message to the server to output the car sharing variable to a newsfeed of the vehicle profile.

16. The method of claim 14 wherein the geofence is a predefined driving area approved by an administrator of the vehicle profile to monitor the vehicle traveling during the predefined time of the use request.

17. The method of claim 16, further comprising generating a message to the server to notify the administrator of the vehicle profile that the vehicle has driven outside the geofence.

18. A computer-program product embodied in a non-transitory computer readable medium having stored instructions for programming a processor, comprising instructions for:
in response to a vehicle profile login at a server, transmitting a contact identification and vehicle information;
receiving a contact profile and vehicle profile based on the contact identification and vehicle information;
transmitting the contact and vehicle profile to a system; and
adjusting a vehicle function at the system based on the contact profile.

19. The computer-program product of claim 18, wherein the server is configured to accept or reject a connection request from a contact.

20. The computer-program product of claim 19, further comprising instructions for recognizing an occupant in a cabin of the vehicle, transmitting the contact identification based on the occupant, and receiving a portion of at least one of basic information, music preference, entertainment preferences, and scheduled events from the contact.

21. The computer-program product of claim 20, further comprising instructions for receiving the portion of the at least one basic information, music preference, entertainment preferences, and scheduled events and transmitting the portion to one or more vehicle functions in communication with the system.

22. The computer-program product of claim 21 wherein the basic information is at least one of age, gender, weight, and height.

23. The computer-program product of claim 22, wherein the basic information is used by the one or more vehicle functions to calibrate a vehicle restraint system for the occupant.

24. The computer-program product of claim 23, further comprising instructions for determining location of the occupant in the cabin of the vehicle such that a restraint device for the contact is calibrated by the vehicle restraint system.

25. The computer-program product of claim 24, further comprising instructions for outputting a message to confirm the location of the occupant in the cabin of the vehicle.

26. The computer-program product of claim 18, further comprising instructions for enabling a security firewall for preventing data received from the server to be transmitted to a safety system.

27. The computer-program product of claim 18, wherein the vehicle profile is at least one of vehicle location, speed, maintenance data, safety restraint status, and number of occupants in the vehicle.

28. The computer-program product of claim 27, wherein the safety restraint status is an indicator to determine if a seat belt is engaged for the occupant.

29. The computer-program product of claim 27, wherein the maintenance data is at least one of oil life, tire pressure, and enabled diagnostic codes.

* * * * *